United States Patent [19]

Pearson

[11] 4,434,575
[45] Mar. 6, 1984

[54] MARINE TRAP SENSING SYSTEM

[76] Inventor: Arthur W. Pearson, 2045 SW. 17 Cir., Deerfield Beach, Fla. 33441

[21] Appl. No.: 427,690

[22] Filed: Sep. 29, 1982

[51] Int. Cl.³ .............................................. A01K 69/00
[52] U.S. Cl. ....................................... 43/100; 43/17.1
[58] Field of Search .................. 43/100, 102, 105, 16, 43/17, 17.1; 340/568, 569, 573, 620, 666

[56] References Cited

U.S. PATENT DOCUMENTS

| | | | |
|---|---|---|---|
| 3,508,358 | 4/1970 | Lee | 43/17.1 |
| 3,878,496 | 4/1975 | Erickson | 340/573 |
| 3,942,167 | 3/1976 | McClintock | 340/620 |
| 4,004,234 | 1/1977 | Juvinall | 340/568 |
| 4,015,236 | 3/1977 | Boudeville | 340/573 |
| 4,262,284 | 4/1981 | Stieff et al. | 340/568 |
| 4,361,827 | 11/1982 | Geller | 340/568 |

Primary Examiner—Nicholas P. Godici
Assistant Examiner—Kurt Rowan
Attorney, Agent, or Firm—Eugene F. Malin

[57] ABSTRACT

A new and improved marine trap alarm with a sensing system that includes an electrical current producing source such as a battery, a normally open pair of contacts with at least one movable contact to be actuated by an animal entering the trap, and a trap sensing circuit connected to the open contacts. The trap sensing circuit includes a true comparator and a silicon controlled rectifier. The true comparator prevents an output when the input does not reach a designed threshold value. The true comparator includes the operational amplifier that has critical discrete component values that are engineered to render input current flow bridging the contacts by way of the high saline fluid environment inoperative, thereby eliminating false output signals to an alarm or indicator. When the normally open pair of contacts is closed by the weight of the animal, a differential potential then exists between the inverting and noninverting inputs of the operational amplifier causing the output voltage to rise and trigger the latching circuit to set off the alarm.

9 Claims, 6 Drawing Figures

MARINE TRAP SENSING SYSTEM

BACKGROUND OF THE INVENTION

This invention relates to trap sensing circuits for signalling an alarm which will indicate to a marine trapper that an animal is in the trap.

The present state of the art of marine trap sensing systems has not overcome the problems of false signal output due to the high saline condition of the underwater environment. This desirable feature, while recognized, has not been achieved by the prior art through the use of circuits and components in the electrical circuitry of the sensing system itself. The disadvantages which are produced by false signals require the marine trapper to be present in the area and they also have a tendency to scare away the animals as the traps are lifted from the water and replaced with greater frequency thus disturbing the trap environment and producing a smaller harvest of animals.

A new and improved marine trap alarm with a sensing system that includes an electrical current producing source such as a battery, a normally open pair of contacts with at least one movable contact to be actuated by an animal to be trapped, and a trap sensing circuit connected to the open contacts. The trap sensing circuit includes a true comparator and a silicone controlled rectifier. The true comparator includes an operational amplifier that is controlled by critical discrete cmponent values that are engineered to neutralize input current flow bridging the contacts by way of the high saline fluid environment, which would otherwise be an input current flow to the operational amplifier under high saline fluid environment to eliminate false output signals to an alarm or indicator. When the normally open pair of contacts is closed by the weight of the animal, a differential potential then exists between the inverting and noninverting inputs of the operational amplifier causing the output voltage to rise and trigger the latching circuit to set off the alarm.

SUMMARY OF THE INVENTION

A new and improved marine trap alarm with a sensing system that includes an electrical current producing source such as a battery, a normally open pair of contacts with at least one movable contact to be actuated by an animal entering the trap, and a trap sensing circuit connected to the open contacts. The trap sensing circuit includes a true comparator and a silicon controlled rectifier. The true comparator prevents an output when the input does not reach a designed theshold value. The true comparator includes the operational amplifier that has critical discrete component values that are engineered to render input current flow briding the contacts by way of the high saline fluid environment inoperative, thereby eliminating false output signals to an alarm or indicator. When the normally open pair of contacts is closed by the weight of the animal, a differential potential then exists between the inverting and noninverting inputs of the operational amplifier causing the output voltage to rise and trigger the latching circuit to set off the alarm.

It is an object of the present invention to overcome the disadvantages of the prior art through critical discrete components designed and engineered to neutralize input current flow to the alarm indicator.

Another object of the invention is to provide a marine trap with circuitry capable of comparing the input voltage to a base level voltage, which is the voltage potential which exists in the high saline environment. When the voltage potential or differential exists above this level, the output voltage will then trigger the alarm circuit detector allowing the operator to manually close the trap about the animal in response to the visual signal and the alarm buzzer. This will enable a more efficient and productive harvest of animals.

In accordance with these and other objects which will become apparent hereinafter, the instant invention will now be described with reference to the accompanying drawings.

PREFERRED EMBODIMENT OF THE INVENTION

Figure 1A:
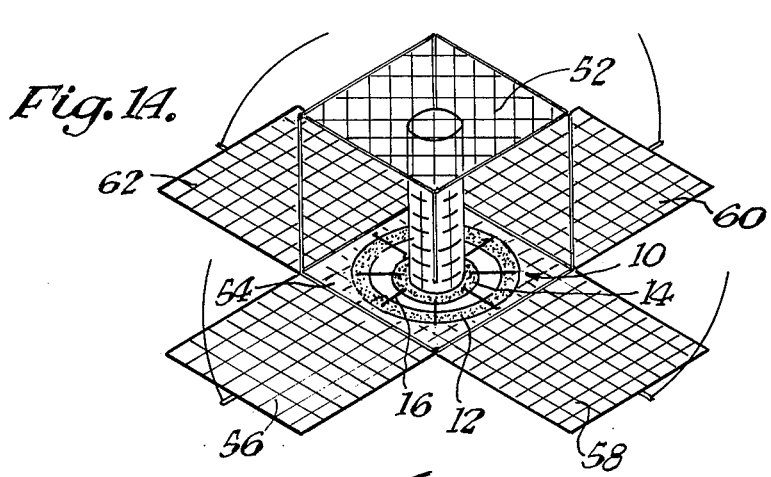
FIG. 1A is an illustration of the crustacian trap in an open three-dimensional view.
Figure 1B:
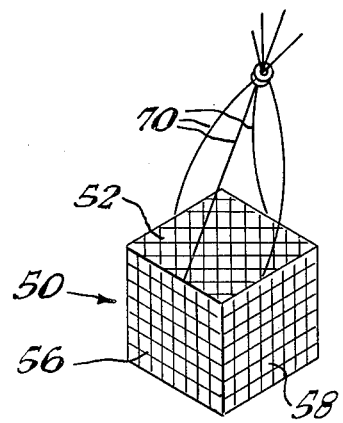
FIG. 1B is an illustration of the trap in FIG. 1A in a closed configuration.
Figure 2:
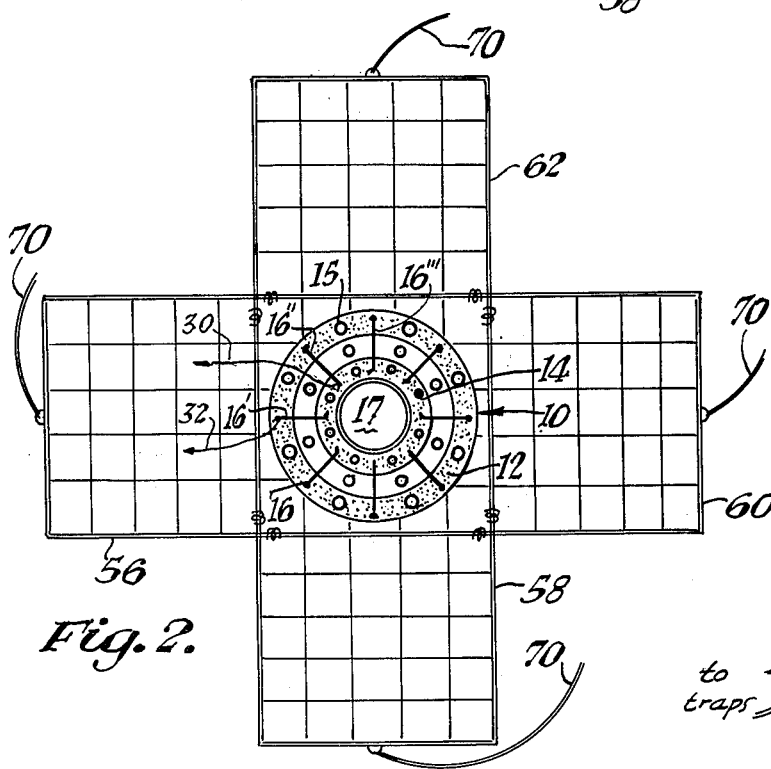
FIG. 2 is an illustration of a top plan view of the crustacean trap in the open configuration with the top and vertical structure removed.

Referring now more in detail to the drawings, FIGS. 1A, 1B and 2, a marine trap having a top 52, bottom 54, four sides 56, 58, 60 and 62 is shown in an open position in FIG. 1A and a closed position in FIG. 1B. The marine trap with the top grid removed and with the sides open to show the position of the sensing system's sensor disc board 10 connected to the marine trap by mounting bolts. The sensor disc board 10 is a standard printed circuit board of the copper dipped solder type. The disc board 10 is fixedly mounted to the marine trap. In the preferred crab trap embodiment, the ring is ten inches in diameter, allowing it to fit into the standard marine crab traps illustrated in FIGS. 1A and 1B. However, the sensor disc board 10 may be made smaller or larger to fit into different size traps.

Figure 4:
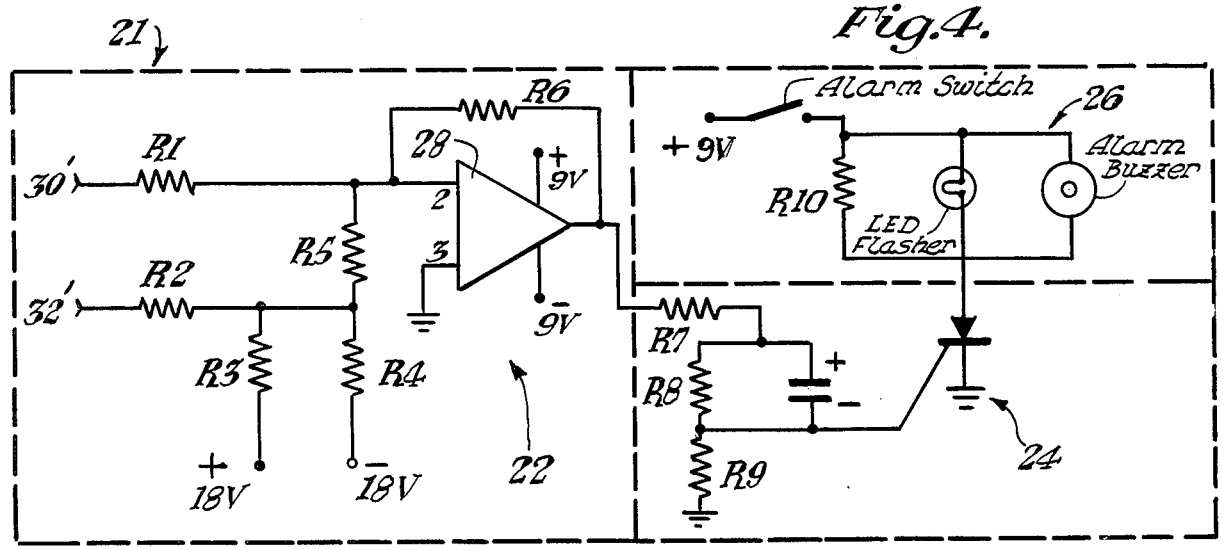
FIG. 4 is a schematic diagram of the electrical circuitry of the crab trap sensing board with the electronic alarm.

The sensor disc board 10 contains an outer sensing ring 12 and an inner sensing ring 14. Holes are drilled into the board between the inner sensing ring 14 and the outer sensing ring 12. The holes are drilled at intervals to reduce board skating when the trap is pulled in . The sensing system includes the sensor disc board 10 and the alarm circuit 21. Wires at 30 and 32 releasably connect the disc board sensing rings to the alarm circuitry 21 at 30' and 32' as shown in FIG. 4. Said alarm circuity is located above the water level so as to be detachable by the marine trapper. The wires 30 and 32 are supported against strain or tension, that is, they are twisted and entwined with the ropes 70 which manually close the side door of the trap and are used to lift and lower the trap. The wires 30 and 32 may be number twenty gauge.

The spring wire sensors 16, 16', 16" and 16''' etc. are permanently affixed at one end in the preferred embodiment by soldering to the outer sensing ring 12 at various places equidistantly around said ring. The other end of the spring wire sensors 16, 16', 16" etc. are at rest above the inner sensing ring 14. In the preferred embodiment the sensing rings are approximately one half inch wide with a spacing between of approximately one inch wide. As an animal moves into the trap to approach bait positioned at 17, its weight moves the distal end of the wire sensors into engagement with sensing ring 14.

Figure 3:
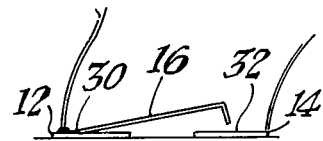
FIG. 3 is an enlarged side elevational view of the contacts which activate the sensing unit in FIG. 1A.
Figure 5:
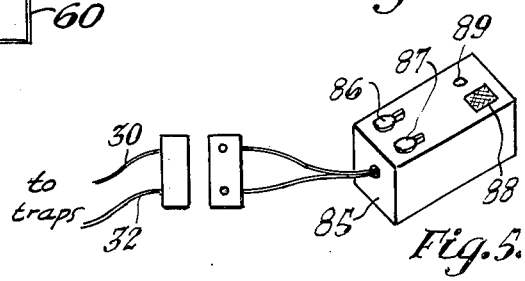
FIG. 5 is an illustration of the hand held control.

As shown in FIG. 3, the spring wire sensor 16 is normally in the open position with the permanently affixed end 18 directly connected at all times to the outer sensing ring 12. The open contact end 20 is at normal rest position above the inner sensing ring 14. The weight of the animal upon the open contact of the spring wire 16 forces said contact against and onto the inner sensing ring 14 providing a complete circuit throughout the system when the circuit is completed.

Referring now to an alarm circuit 21 that will provide an alarm only when the wire sensors make contact, the electrical flow across the contacts through the conductive salt water or brackash water is not allowed to initiate the alarm. FIG. 4, shows the electrical alarm circuit 21 that is connected to trap sensing circuit board 10. The electrical alarm circuit 21 is comprised of a true comparator circuit 22, an alarm circuit detector 24 and and alarm circuit 26. The true comparator 22 includes an operational amplifier 28 with a feedback circuit that is controlled by critical discrete component values R1 through R7 shown in the table below.

TABLE OF VALUES

| Component | Value | |
|---|---|---|
| R1 | 10 ohms | ¼ watt |
| R2 | 10 ohms | ¼ watt |
| R3 | 22 ohms | ¼ watt |
| R4 | 2.2K ohms | ¼ watt |
| R5 | 2.2K | ¼ watt |
| R6 | 1K | ¼ watt |
| R7 | 10 | ¼ watt |
| R8 | 1 meg | ¼ watt |
| R9 | 1K | ¼ watt |
| R10 | 100 ohms | ½ watt |
| C1 | .1/10 wv | |

Due to the high saline content of the environment, an electrical potential always exists between the contact 16 connected to the outer sensing ring and sensing ring 14 as well as between the rings 12 and 14 themselves. The comparator thus samples the voltage applied from 30' through resistor R1 to the input pin 2 of the amplifier 28.

The voltage at pin 3 is grounded to produce a zero reference voltage on the positive pin. Minor voltage fluctuations caused by the saline environment and water movements are fed bach through R6 where they re-enter pin 2 in the form of negative voltage. It, therefore requires a positive input voltage greater than that flowing through the feedback loop, R6, to produce the necessary output voltage to trigger the alarm circuit through R7.

The signal is then applied to the gate terminal of the silicone controlled rectifier (SCR) which is normally an open circuit. If the gte signal is great enough it is applied at the SCR gate terminal to cause the SCR to rapidly switch to the conducting state. This in turn activates the alarm circuit 26. As can be noted, the true comparator circuit 22, the alarm circuit detector 24 and the alarm circuit are separated by dashed lines separating the three separate circuits. The alarm circuit 26 consists of an LED flasher, or lamp, an alarm buzzer and the alarm switch which is connected to the power source, a 9 volt battery. When the SCR switches on, the LED flashes and the alarm buzzer is activated, signalling through visual and auditory means to the trapper.

The hand held control box 85 includes an arm switch 86, power switch 87, buzzer 88 and flasher 89. The leads are connected to connector plate with connectors 30" and 32" for connecting with lines 18 and 20 connected to the crab trap.

The instant invention has been shown and described herein in what is considered to be the most practical and preferred embodiment. It is recognized, however, that departures may be made therefrom within the scope of the invention and that obvious modifications will occur to a person skilled in the art.

What I claim is :

1. A saline water animal sensing system comprising:
   a circuit closure means normally open for indicating entry across said closure means,
   an electrical current producing source connected to each said closure means,
   electronic circuit means for annunciating a closed circuit across said circuit closure means,
   said electronic circuit means comprising means for preventing current flow across said circuit closure means due to the immersion of the circuit closure means in saline water.

2. A system as in claim 1, in which the means for closure of said normally open circuit is a mechanical switch responsive to the weight of an animal.

3. A system as in claim 1 including a means for sensing by differentially operative components with engineered values that neutralize the normally existing potential of the saline environment.

4. A system as in claim 1 wherein said system is adaptable for use in all standard marine traps.

5. A system as in claim 1 wherein said alarm means is held by the marine trapper and may be alternately connected to any number of traps.

6. The system of claim 1, wherein said electronic means comprises:
   a differential amplifier means, a switching means, and an annunciator means,
   said annunciator means annunciating said entry across said closure means in response to switching of said switching means, said switching means switching responsive to output of said differential amplifier means, said differential amplifier means generating output in response to electrical closure of said circuit closure means,
   said differential amplifier means biased so that electrical closure of said circuit closure means caused by immersion of said circuit closure means in saline water is ineffective to cause said differential amplifier means to cause said switching means to switch.

7. The system of claim 6, wherein said circuit closure means is a mechanical switch selected so that closure of said switch responsive to the weight of an animal constitutes electrical closure of said electrical closure means effective to cause said differential amplifier means to cause said switching means to switch.

8. The system of claim 1, wherein said differential amplifier is an operational amplifier, and said switching means is a silicon controlled rectifier.

9. An animal sensing system comprising:
   a circuit closure means normally open for indicating entry across said closure means,
   an electrical current producing source connected to each said closure means,
   electronic circuit means for annunciating a closed circuit across said circuit means,
   said electronic circuit means comprising means for preventing current flow across said circuit closure means due to the immersion of said circuit closure means in saline water.

* * * * *